(No Model.)
J. L. MANNING.
PRUNING IMPLEMENT.
No. 598,428. Patented Feb. 1, 1898.
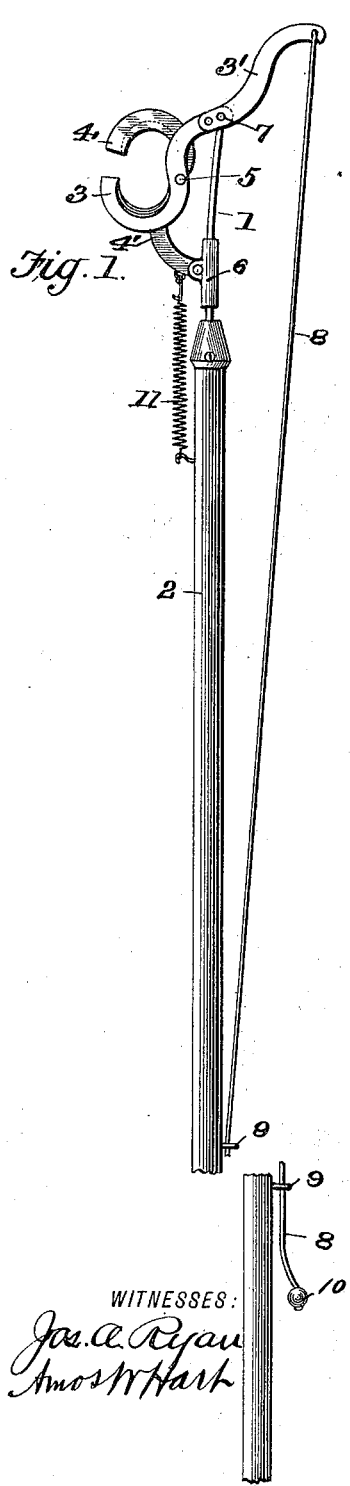
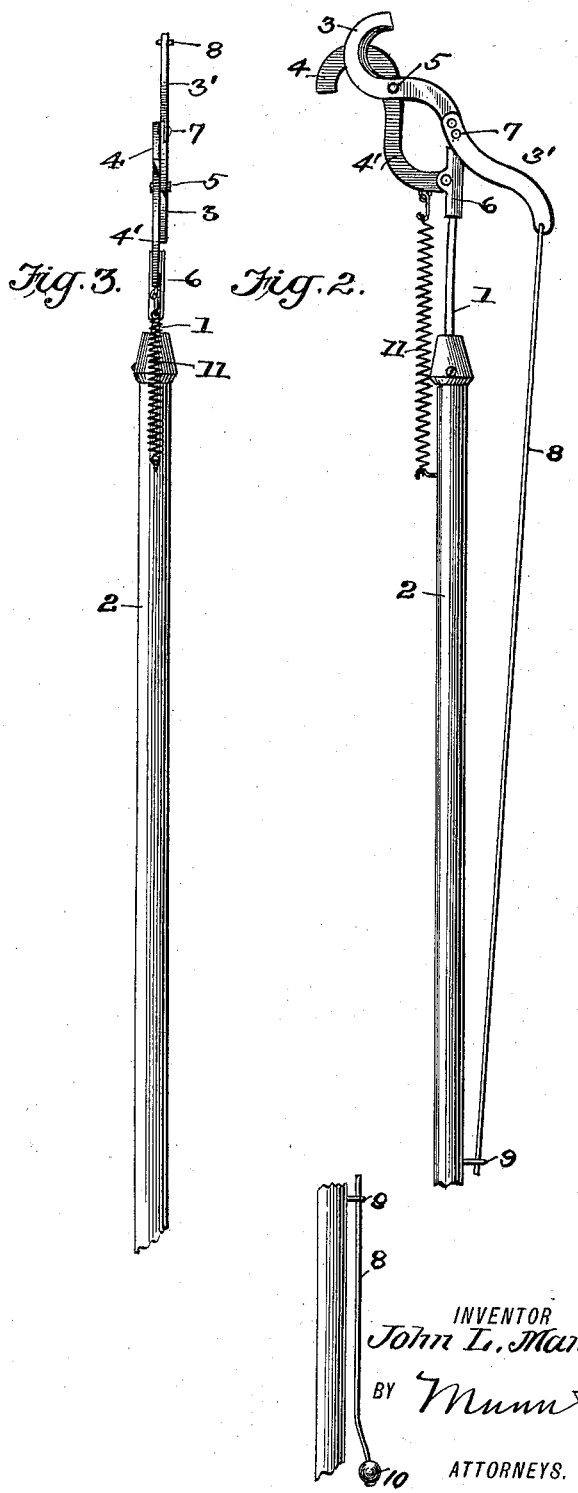
WITNESSES:
INVENTOR
John L. Manning
BY Munn & Co.
ATTORNEYS.

UNITED STATES PATENT OFFICE.

JOHN L. MANNING, OF BARTOW, FLORIDA.

PRUNING IMPLEMENT.

SPECIFICATION forming part of Letters Patent No. 598,428, dated February 1, 1898.

Application filed July 7, 1897. Serial No. 643,704. (No model.)

*To all whom it may concern:*

Be it known that I, JOHN L. MANNING, of Bartow, in the county of Polk and State of Florida, have invented certain new and useful Improvements in Pruning Implements, of which the following is a specification.

My improved implement is distinguished by such construction and arrangement of cutting mechanism that a tree limb or bough may be severed without pulling on the same, so that danger of breaking or splitting the limb at a point near the tree-trunk is avoided. I employ twin cutters which are hook shape and pivoted together and to other parts attached to the staff or handle, so that a pull on the lever-arm of one cutter operates—*i. e.*, closes—both cutters simultaneously.

In the accompanying drawings, Figure 1 is a side view of my improved implement, showing the cutters in the normal position, in which they are adapted to be applied to a tree-limb. Fig. 2 is a side view showing the cutters in closed position. Fig. 3 is an edge view of the cutting mechanism.

An iron or steel rod 1 is fixed in the upper end of the wooden staff or handle 2 and in alinement therewith, as shown. The rod may be secured to the handle by a screw or in any other suitable manner and is practically a reduced extension of the same.

The hook-shape cutters or blades 3 4 are pivoted together at 5 and provided with extended curved shanks or lever-arms 3' and 4'. The longer lever-arm 3' of the lower cutter 3 is pivoted to the outer end of the aforesaid rod 1, while the other arm, 4, is pivoted to a sleeve 6, that slides freely on the rod 1. The cutters 3 4 are so shaped as to form an almost perfect circle when closed together, so that they will closely embrace the tree limb or bough to be cut and cannot be detached therefrom until opened. The longer lever-arm 3' of cutter 3 is shown constructed in two parts, which are rigidly connected by screws, one of which, 7, forms the pivot of the lever; but this construction is not essential, since it is obvious the operation would be the same if the lever 3' were made integral. A pull-rod 8 is pivotally connected with the free end of said lever-arm 3' and slides in ring-guides 9, affixed to the handle 2. The lower end of the pull-rod is provided with a suitable hand-grip 10, as shown.

For the purpose of holding the cutters open, more especially when the implement is being used in a horizontal or downwardly-inclined position, I employ the helical spring 11, which connects the sleeve 6 with the handle 2, as shown.

The operation of the implement is apparent. The jaws or cutters 3 4 being passed over a limb or bough, the rod 8 is pulled, whereby the longer lever 3' raises both cutters, since the sleeve 6, to which the upper one 4 is pivoted, is caused to slide upward on the rod 1, and thus both cutters are closed simultaneously on the limb, and the pull and pressure being continued with due force the limb is severed with comparative ease without the necessity of pulling on the handle 2, as usual in pruning implements of this class.

When the implement is held in a horizontal position or inclined downward, the sleeve 6 will not slide readily, and hence I employ a spring 11, in this instance of helical form, to connect the sleeve to the handle 2. The spring obviously tends to draw the sleeve 6 back on the rod 1, so that the cutters are held normally open irrespective of the inclination at which the implement is held.

It is apparent that cord, rope, or wire may be used in place of the pull-rod in many conditions of practical use of the implement.

What I claim is—

1. The improved pruning implement, comprising a staff or handle, two cutters pivoted together and provided with extended shanks that serve as levers, one of such levers being pivoted to a rigid extension of the handle, a sleeve, which is slidable on the handle extension, and pivotally connected with the shorter lever, and a pull-rod attached to the longer lever, whereby tension on the rod raises both jaws and closes them substantially as shown and described.

2. In a pruning implement, the combination with a supporting-staff of two hook-shape cutters, pivoted together, one cutter having an extended shank or lever-arm which is pivoted to the handle, the other cutter having a slidable connection with the handle, and a pull-rod connected with the said extended shank or lever-arm, substantially as shown and described, to operate as specified.

3. In a pruning implement, the combination with the handle and alined rod fixed therein, of the sleeve which is adapted to slide on said rod, the spring connecting the sleeve with the handle, the twin hook-shape cutters, pivoted together, the shank of one cutter being pivoted to the sleeve and the shank or arm of the other pivoted to the outer end of the rigid rod, and the pull-rod, all as shown and described.

JOHN L. MANNING.

Witnesses:
J. E. WHATLY,
C. T. KING,
E. C. STUART.